United States Patent [19]

Ringel et al.

[11] Patent Number: 4,536,838
[45] Date of Patent: Aug. 20, 1985

[54] MULTI-PROCESSOR SYSTEM WITH COMMUNICATION CONTROLLER USING POLL FLAGS FOR NON-CONTENTIOUS SLOT RESERVATION

[75] Inventors: Gerhard Ringel; Gabor Fencsik, both of Berkeley, Calif.

[73] Assignee: MDS Qantel, Inc., Hayward, Calif.

[21] Appl. No.: 478,604

[22] Filed: Mar. 24, 1983

[51] Int. Cl.³ .................... G06F 3/04; G06F 15/16
[52] U.S. Cl. ............................ 364/200; 370/85; 340/825.5
[58] Field of Search ... 364/200 MS File, 900 MS File; 340/825.5, 825.51; 370/85, 92-94

[56] References Cited

U.S. PATENT DOCUMENTS

| | | | |
|---|---|---|---|
| 4,210,780 | 7/1980 | Hopkins | 370/80 |
| 4,271,505 | 6/1981 | Menot | 370/85 |
| 4,380,065 | 4/1983 | Hirtle et al. | 370/96 |
| 4,387,441 | 6/1983 | Kocol | 364/200 |
| 4,445,213 | 4/1984 | Baugh et al. | 370/94 |
| 4,456,956 | 6/1984 | El-Gohary | 364/200 |
| 4,464,749 | 8/1984 | Ulug | 370/85 |
| 4,494,113 | 1/1985 | Yamaoka et al. | 340/825.5 |

Primary Examiner—James D. Thomas
Assistant Examiner—A. G. Williams, Jr.
Attorney, Agent, or Firm—Robert R. Hubbard

[57] ABSTRACT

A communication controller for a distributed processing system has a number of data processing stations in which messages are exchanged among the stations over a communication channel. The controller includes a communications processing unit which manages the transmission and receipt of messages. A program is provided for the communications processing unit which responds to an inbound message addressed to the associated station with its poll flag asserted to cause the station to immediately contend for use of the channel. No other station can contend for use of the channel at this time because their corresponding communication processing units responded to such inbound message as being addressed to another station. This causes a predetermined time interval to start. Each of the other units then awaits expiration of the interval before attempting to contend for use of the channel. This assures immediate use of the channel to the station which receives an inbound message addressed to it with a poll flag asserted.

4 Claims, 4 Drawing Figures

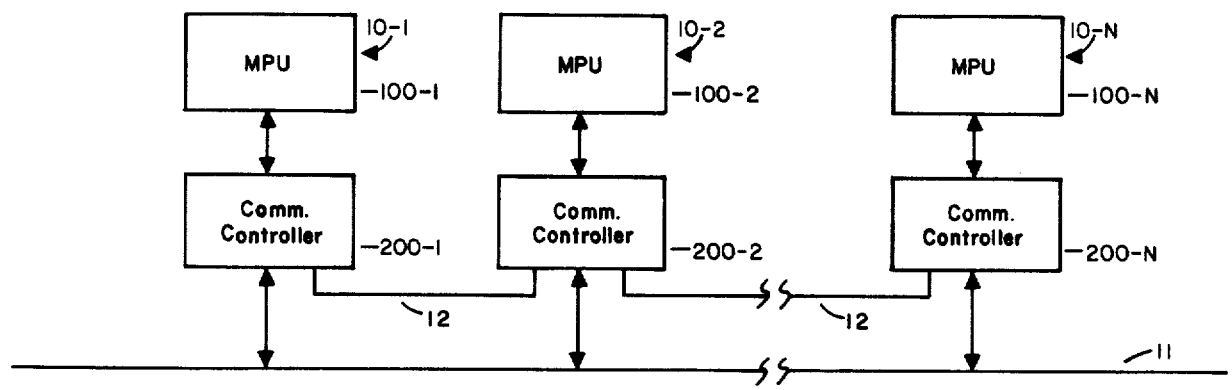
FIG. I
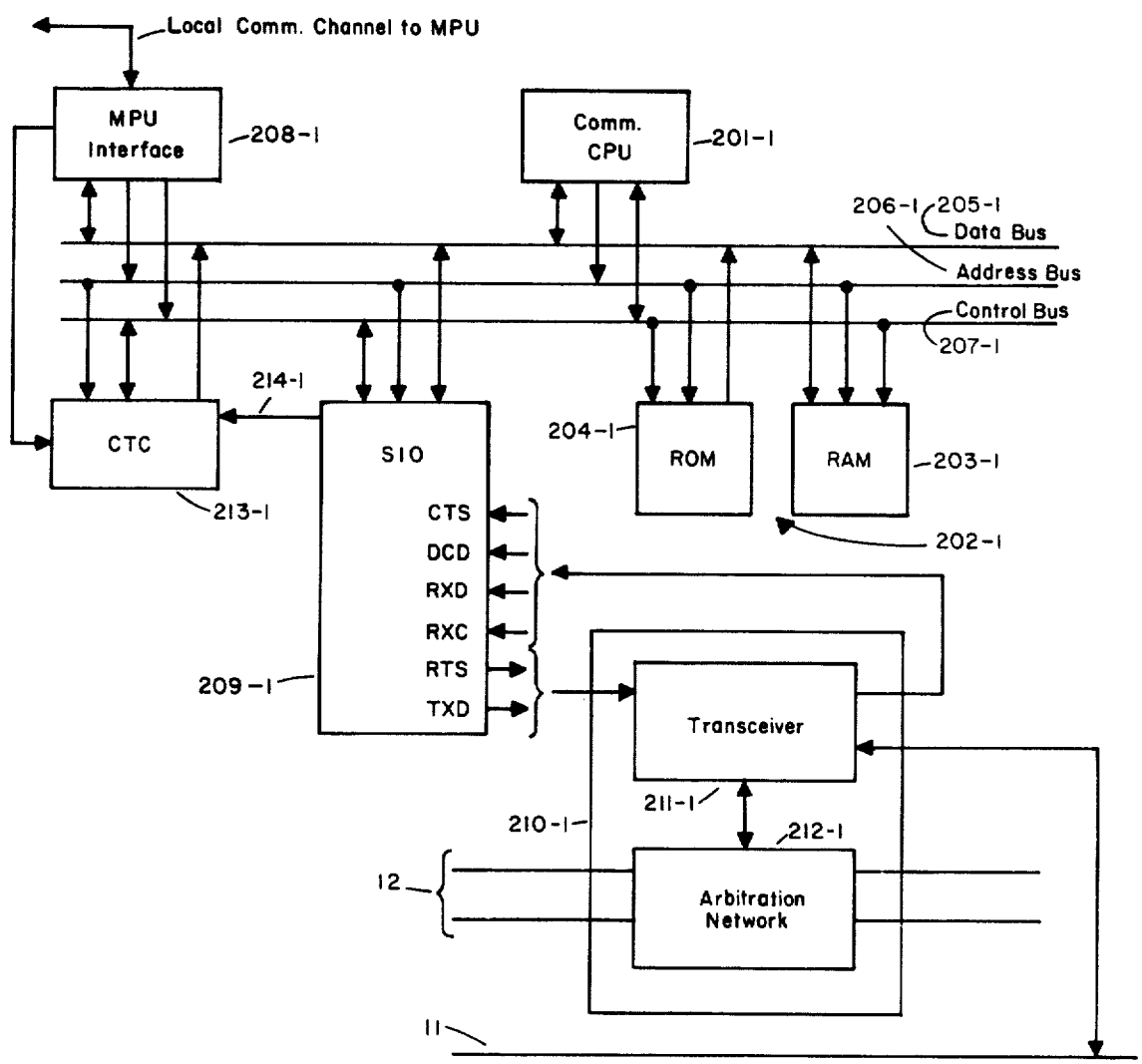
FIG. 2

MULTI-PROCESSOR SYSTEM WITH COMMUNICATION CONTROLLER USING POLL FLAGS FOR NON-CONTENTIOUS SLOT RESERVATION

FIELD OF THE INVENTION

This invention relates generally to data processing systems and in particular to a novel and improved communication controller for communication among two or more processors in a distributed processing environment.

In a distributed processing system consisting of a number of processor stations, a user at one station can access data and/or run programs resident at another processor station. That the data and/or programs are resident at another processor station is for all practical purposes invisible or transparent to the user. In such a system a communication controller is associated with each processor station and serves the purpose of controlling the exchange of messages between its associated processor and the other processor stations.

BACKGROUND OF INVENTION

Some messages involved in communication exchanges among the stations of a distributed processing environment require an answer or reply message. For example, communication protocols adapted from International Standard ISO 4035, Data Communication High Level Data Link Control Procedures Elements of Procedures, first edition 1979-04-15, require that a link between two stations be in a data transfer state before data can be exchanged between the two stations. This is accomplished by a sending station transmitting to the receiving station a Set Asynchronous Response Load Command (SARM) command to the receiving station. The receiving station must return as a reply message an Unnumbered Acknowledgment (UA) to establish the link in a data transfer mode. The sending station can then begin transmitting to the receiving station information messages or I-frames.

The aforementioned High Level Data Link Control (HDLC) procedure provides a facility by which a sending station can demand that a receiving station return a reply message. This facility consists of a signaling bit contained in the message and called the Poll/Final (P/F) bit. This bit when set by the sending station requires (1) that the receiving station return a reply message with the P/F bit set and (2) that the sending station not issue any other frame on the link with the P/F bit set to one until it receives such reply message from the receiving station with the P/F bit set to one. A problem with such a procedure is that other processors could gain control of the communication bus or channel effectively locking out the reply message and thereby hanging up the message exchange for time periods on the order of several hundred milliseconds or more. This is unacceptable in distributed processing system environments.

SUMMARY OF THE INVENTION

The present invention is embodied in an improved communication controller in a multiple data processing station system in which messages are exchanged among the stations over a common communication channel. The stations contend with one another for use of the channel. Each message includes fields identifying the addresses of the sending station and of the receiving station and a poll flag. When a sending station transmits a message to a receiving station with the poll flag asserted, the receiving station must immediately contend for use of the channel. That is, assertion of the poll flag is essentially a demand for an immediate reply message. All other stations must wait for a predetermined interval before they can contend for use of the channel, thus assuring that the receiving station will obtain use of the channel.

The communication controller embodying this transmission slot reservation feature of this invention includes a processing unit, a memory means and a channel interface unit interconnected with one another. The controller further comprises a control means which includes a program stored in the memory means. The program operates the processing unit to immediately issue a command for contention of the channel in response to the receipt of an inbound message, addressed to the associated data processing station with the poll flag asserted. The processing unit also issues a command for contention of the channel only after a predetermined interval in response to a message which is addressed to another station or, though addressed to the associated station, has a nonasserted poll flag. The predetermined interval occurring after a message with its poll flag asserted is always reserved for sole contention of the channel by the receiving station of that message.

BRIEF DESCRIPTION OF THE DRAWING

The above and other features and advantages of the present invention will become more apparent from the following description taken in conjunction with the accompanying drawing, in which:

FIG. 1 is a block diagram of a distributed processing system in which the communication controller of this invention may be employed;

FIG. 2 is a block diagram of the communication controller embodying the invention;

DESCRIPTION OF PREFERRED EMBODIMENT

Figure 3:
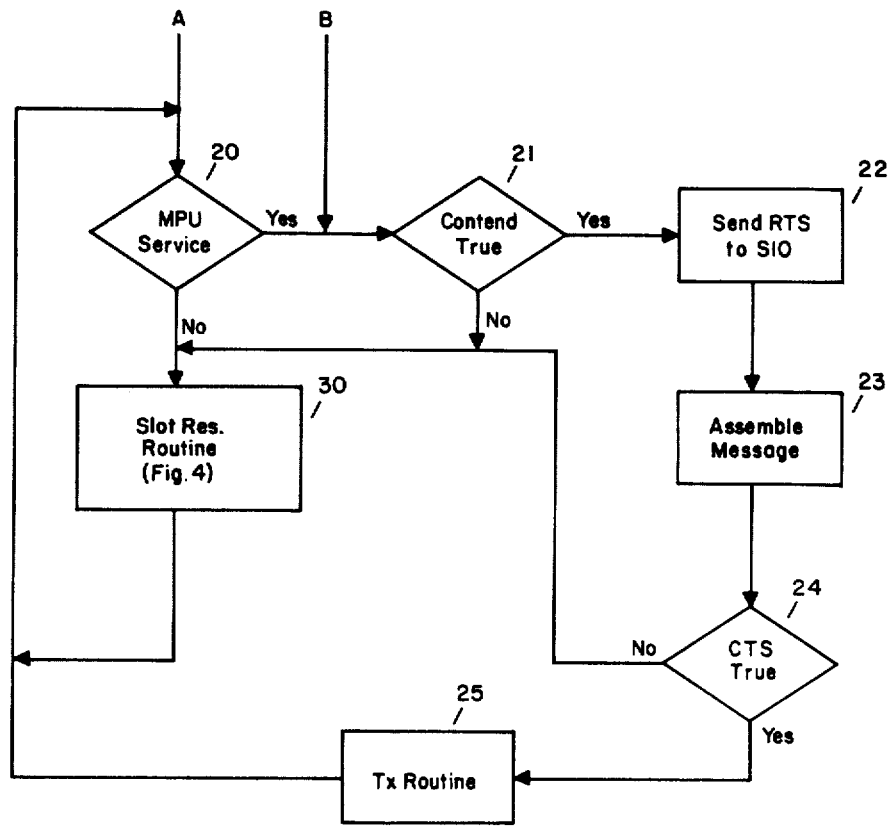
FIG. 3 is a flow diagram of the program routine which operates the communication controller to achieve the slot reservation feature of this invention.

Although the slot reservation feature of this invention can be employed in a variety of communication applications, by way of example and completness of description, the inventive feature will be described herein in a communication controller for a distributed processing system.

A typical distributed processing system is shown in FIG. 1 to include a number of data processing work stations 10-1, 10-2, . . . 10-N which are interconnected with one another for communication purposes by a communication channel 11. Each data processing work station includes a main computer and a communication controller connected as an interface between the main computer and the communication channel 11. To this end, the data processing stations 10-1, 10-2, . . . 10-N include main processing units (MPUs) 100-1, 100-2 . . . 100-N interconnected via local communication channels with communication controllers 200-1, 200-2 . . . 200-N respectively. The MPU of a data processing station serves to transmit commands and data over its local communication channel to its associated communication controller for communication to another of the data processing stations.

The particular scheme or technique employed to seize control of the communication channel 11 is unimportant to an understanding of the present invention. However, for the purpose of completness of description, the communication controllers 200-1, 200-2 . . . 200-N are shown to be interconnected by a separate contention cable 12.

Each of the communication controllers is substantially identical in structure so that only controller 200-1 will be described in any detail. Referring now to FIG. 2, the heart of the controller is a communication processing unit or Comm CPU 201-1 which under the control of a program stored in a memory means 202-1 directs the interpretation and exchange of message traffic between its associated MPU 100-1 and any of the other data processing stations. This control is exercised over an internal bus consisting of a data bus 205-1, an address bus 206-1 and a control bus 207-1. An MPU interface 208-1 is interposed between a local communication channel to the MPU 100-1 (FIG. 1) and the internal bus.

The message traffic consists of outbound and inbound messages. The outbound messages originating in the associated MPU are routed via the MPU interface 208-1 to the memory 202-1. Other outbound messages which are replys to inbound demand messages are formatted in memory 202-1 by the Comm CPU. Inbound messages are routed from the communication channel 11 via transceiver 211-1 and a Serial Input/Output (SIO) unit 209-1 to the memory 202-1. For outbound messages, the CPU acts to direct the SIO to transmit the message via transceiver 211-1 onto the communication channel 11. For inbound messages, the CPU acts to interrupt the associated MPU via the MPU interface. The MPU then in turn reads the message in the memory 202-1.

The Comm CPU is interrupt driven by the MPU and the SIO. The MPU interrupt to the Comm CPU is routed via the MPU interface 208-1 to one channel of a counter/timer circuit (CTC) 213-1. Interrupt priority is established by means of a daisy chain connection 214-1 between the SIO and the CTC.

The memory means 202-1 is shown in the illustrated embodiment to include a read only memory (ROM) 204-1 and a random access memory (RAM) 203-1. For this design, the program generally resides in the nonvolitatle ROM 204-1 and the message data is stored in a portion of the RAM 203-1. However, the system could just as well employ a single RAM which contains both the program and the message data.

The Comm CPU, SIO and CTC in the exemplary design take the form of a microcomputer, SIO and CTC respectively, which are available commercially from Zilog, Inc. of Campbell, Calif.

The MPU communicates with the Comm CPU 201-1 via a shared portion of memory 202-1. This can be accomplished in accordance with any known technique. For example, the MPU interface upon receiving a command or message data from the MPU, signals the Comm CPU 201-1 via the control bus 207-1 with a bus request over the internal bus. CPU 201-1 responds with a bus acknowledge and enters a wait state. The MPU interface then performs a DMA (Direct Memory Access) operation to store the command or message data in the memory 202-1 upon arrival from the MPU. When this task has been completed, the MPU via the MPU interface acts to interrupt the Comm CPU 201-1 via the CTC 213-1. The Comm CPU 201-1 responds by branching to a program routine in which it examines the CTC. This in turn causes a branch to further program routines for interpreting the outbound message data being passed. On the other hand, when an inbound message has been received, the Comm CPU acts to interrupt the MPU via the MPU interface. The MPU responds by reading the message from the shared portion of memory 202-1.

The transceiver 211-1 is shown as a portion of a communication channel interface unit 210-1 which also includes an arbitration network 12-1. The arbitration network 12-1 participates in a contention process with its counterparts in the other data processing stations to seize control of the communication channel 11. It does this by coacting with the contention bus 12 and signaling the transceiver 211-1 as to the status of the contention process.

The detailed operation of either the transceiver or the arbitration network is unnecessary to an understanding of the slot reservation feature of this invention. Suffice it to say here that the request to send (RTS) and transmit data TXD outputs of the SIO are routed to the arbitration network via the transceiver. The arbitration network responds to RTS, when asserted, to contend for the bus. The arbitration network provides to the transceiver a clear to send (CTS) signal which signifies that contention was successful, control of the bus has been seized and a message can therefor be transmitted. Transceiver also provides to the SIO a number of signals, namely, carrier detect DCD, receive data RXD, receive clock RXC and clear to send CTS. The DCD signal, when asserted, signifies that there is message traffic on the communication channel 11. The RXD and RXC signals are the receive data and receive clock, respectively, for a message being transmitted over the channel 11. The CTS signal is essentially the clear to send signal derived by the arbitration network 212-1. The transceiver 211-1 and the arbitration network 212-1 may take any suitable form and preferably may take the form as described in a copending patent application entitled Communication Channel Interference Unit Ser. No. 478,921, filed March 24, 1983, in the names of Gabor Fencsik and Fletcher M. Glenn, II., now U.S. Pat. No. 4,511,968.

Whenever the carrier detect DCD signal is asserted, the SIO interrupts the Comm CPU which in turn reads the SIO status. The SIO is programmed as instructed by the manufacturer to recognize its own address. When the message is directed to the data processing station, the SIO acts to receive the message and pass it on to the Comm CPU via the interrupt process. When the message is not directed to the data processing station, the SIO recognizes this and discontinues its receipt of the message. However, in such case the SIO continues to react to the status of the carrier detect DCD signal. When this signal becomes nonasserted, the SIO signals this event to the Comm CPU via the interrupt the read status process.

The format of messages exchanged on channel 11 is as follows:

F F F F F F A1 A2 C . . . I-FIELD (optional) . . . CRC1 CRC2 F F, where F is an HDLC flag character,
  A1 and A2 are destination and source address characters,
  C is a control byte defining the type of message
  CRC1 and CRC2 are message check characters.

The control character consists of the following format:

RRRPSSSX, where RRR and X comprise a message identification field,
SSS comprises either a character number check field or a function modifier field, and
P is a poll bit or flag.

A particular set of message types selected for a communication protocol is a matter of design choice. Important, however, to this invention is that the message contain source and destination addresses and a control character having a poll bit.

In accordance with this invention, each data processing station is normally required to wait for an interval of time (400 microseconds in one design) after message traffic has ended on the communication channel 11 before contending for its use. This applies in all cases except where an original source station or sender sets the poll bit in a message. The destination station or receiver upon recognizing its own address in the original message contends immediately without waiting for control of the communication channel 11 to return a reply message to the original source station sender. That is, the source station or sender of an original message can reserve for the destination station or receiver of that message the next available transmission time or slot over the communication channel 11.

This invention is implemented by means of a program which is stored in the ROM 204-1 and is run by the Comm CPU. As shown in FIG. 3, the system software contains a first loop in which the Comm CPU operates to service MPU interrupts and to establish status of a communication channel contention flag. This loop consists of the MPU service block 20 and the slot reservation routine block 30. When the contend flag status is true, signifying communication channel availability, the software enters a second loop for transmission of a message over the channel. This loop is illustrated in FIG. 3 by blocks 21 through 25. At block 21 the contend flag status is tested. If the flag is false, the operation must return to the slot reservation routine block 30 in the first control loop. If the contend flag status is true, the CPU acts at block 22 to send an RTS command to the SIO signifying that contention is to be made for use of the channel. The CPU then proceeds at box 23 to assemble the message for transmission. At box 24 the status of clear to send (CTS) is tested. If CTS is false, the operation must return to the slot reservation routine as contention for the channel may have been won by another data processing station. On the other hand, if CTS is true, the operation proceeds to a transmit routine at block 25 for transmission of the message. When the transmission has been completed, the operation returns to the entry point A.

Figure 4:
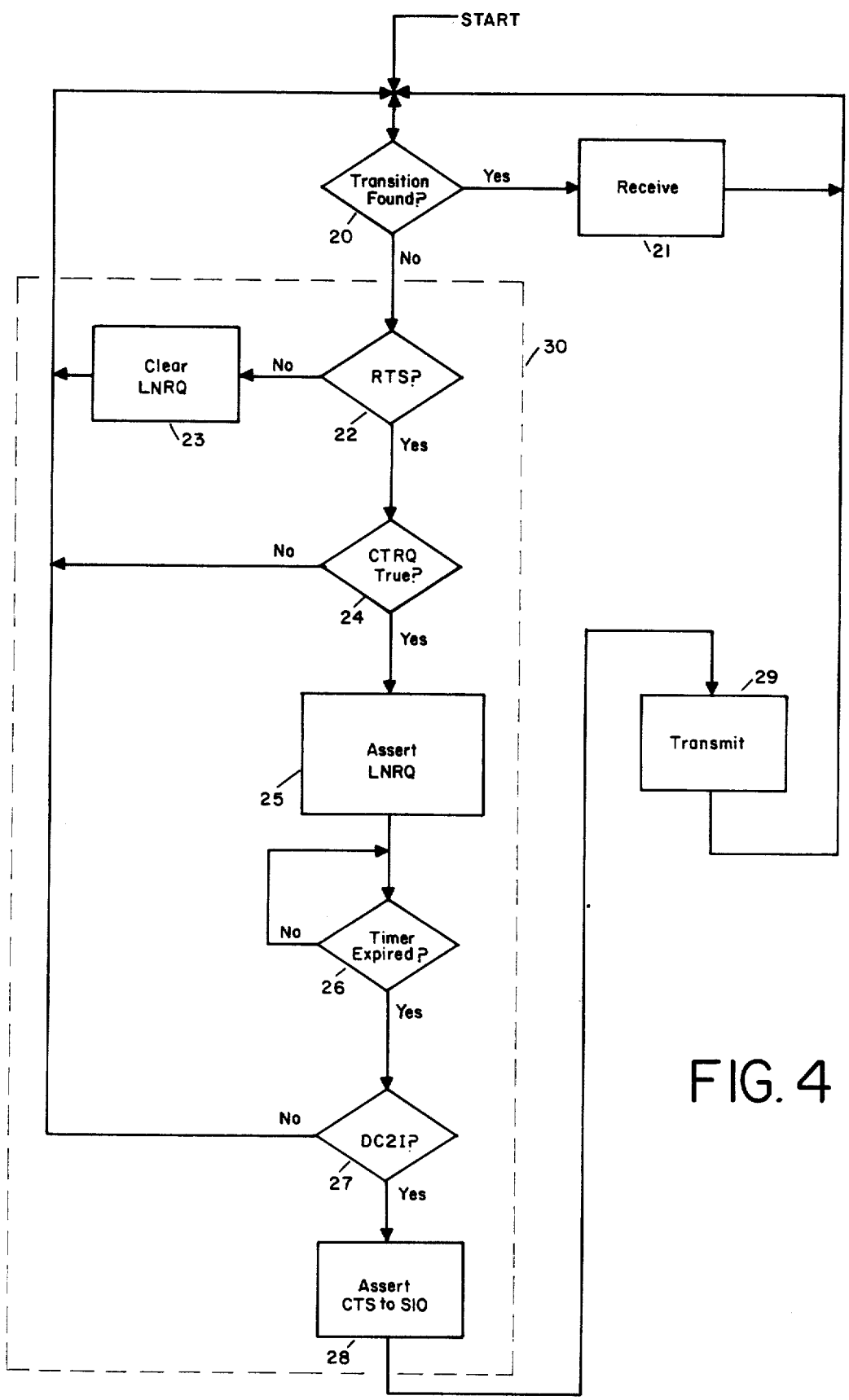
FIG. 4 is a flow diagram of the slot reservation routine included in the flow diagram of FIG. 3.

With reference now to FIG. 4, the slot reservation routine is entered at block 31 for a test of whether message traffic is present on the communication channel 11. If there is, the operation proceeds to block 32 for a test of whether the message is addressed to this data processing station. That is, the destination address of the message is compared to the address of the station. If the addresses do not compare positively (not our address), the operation proceeds to block 33. At this block, a test is performed as to whether the end of the message has occurred. If not, the test continues until the message is completed. This continuation of the test is illustrated in FIG. 3 by means of the connection from the no output to the input of block 33. However, it is to be noted that other processes could be taking place during this time. For example, the no output of block 33 could just as well return to point A in FIG. 3 for servicing of MPU interrupts. In such cases, the program will proceed through the first loop and branches as described above to return to block 33.

When the end of message has occurred, the operation will then proceed to block 34 in order to set the contend flag status to false. The operation continues at block 35 to start or initiate a slot reservation timer and the operation then returns to point A of the first control loop in FIG. 3. Hence, an inbound message not addressed to the data processing station results in the contend flag being set false and a slot reservation interval being established.

Once the slot reservation interval has been started, the CPU must wait until the interval has expired before it can issue a command for contention to use the communication channel 11. This is implemented in another branch of the slot reservation routine. If at block 31 there is no inbound message present on the channel 11, the operation proceeds to block 36. At block 36 the slot reservation timer is examined. If the interval has not expired, the operation returns to the entry point A in FIG. 3. On the other hand, if the interval has expired, the operation proceeds to block 37 to set the contend flag status true. The operation then returns to the entry point A. Hence, at the expiration of the slot reservation interval, the contend flag status will be set true provided that there is no inbound message present on the channel.

In the event the inbound message present on the channel is addressed to the data processing station, the operation will proceed from block 32 to block 38. At block 38, a test is performed as to whether the end of the message has occurred. If not, the test continues until the message is complete. As in the case of block 33, other processes could be going on at this time. For example, the No output of block 38 could just as well be returned to point A of FIG. 3. In such case the program would proceed through the first loop and branches as described above to return to block 38.

When the end of message has occurred, the operation proceeds to block 39. At block 39 the control character is examined to see whether the poll bit is set. If the poll bit is not set, there is no need for an immediate reply message and the operation proceeds the block 34 to set the contend flag false and start the slot reservation interval. That is, for this situation the data processing station must wait for the slot reservation interval to expire before contending for use of the channel.

If the poll bit in the inbound message addressed to the data processing station is set, the station must immediately return a reply message. For this case, the operation proceeds from block 39 to block 40 to set the contend flag status true. The operation then proceeds to point B of FIG. 3 to enter the message transmission loop at block 21. As described above, this loop serves to direct the channel interface unit 210-1 to seize control of the communication channel and to direct unit 210-1 to transmit a message over the channel. It should be noted that for the case of a demand reply message (a message in reply to an original message which has the poll bit set), the status of the CTS flag will be true. This is because all other data processing stations on the channel must wait until the slot reservation interval has expired before they can try for control of the channel.

Thus, while preferred embodiments of the invention are shown in the drawings, it is to be understood that this disclosure is for the purposes of illustration only and the various changes in the hardware and software as well as the substitution of equivalent elements for those herein shown and described may be made without departing from sphere of the scope of this invention as set forth in the appending claims.

What is claimed is:

1. In a multiple data processing station system wherein messages are exchanged among the stations over a communication channel in sequential time slots, wherein the stations contend with one another for use of the channel, and wherein each such message includes fields identifying the addresses fo the sending station and of the receiving station and a poll flag, each such station having an improved communication controller which comprises:
    a processing unit, a memory means and a channel interface unit interconnected with one another and with said channel;
    control means including a program stored in the memory means for operating the processing unit in response to the end of a message to issue to its associated channel interface unit a command for contention of the channel (a) only after a predetermined slot reservation interval if such message is either addressed to another station or though addressed to the associated station has a non-asserted poll flag and (b) immediately if such message is addressed to the associated data processing station and has its poll flag asserted, whereby a station to which an inbound message is addressed with an asserted poll flag will be the sole contender for and winner of control of the channel for the next succeeding time slot; and
    said channel interface unit being operable to transmit and receive such messages and to contend for the channel in response to said commands.

2. The invention as set forth in claim 1 wherein the program includes a first loop in which the processing unit acts to establish the status of a contention flag as either true or false and a second loop which is entered at the completion of message traffic on the channel and in which the processing unit acts to issue said commands for contention of the channel in the event the contention flag status is true and to return to the first loop in the event the contention flag status is false.

3. The invention as set forth in claim 2 wherein the first loop includes a first branch for initiating said predetermined interval and for setting the contention flag status false, a second branch for setting the contention flag status true at the completion of an inbound message addressed to the associated station with its poll flag asserted and a third branch for setting the contention flag status true in the absence of message traffic on the bus and after the predetermined time interval has expired.

4. The invention according to claims 1, 2 or 3 in which:
    each data processing station includes a main processor;
    each controller includes a main processor interface circuit unit interconnected with the main processor, the memory and the CPU; and
    the main processor and main processor interface unit acting (1) in response to an interrupt from the CPU to read inbound messages from the memory and (2) to place outbound messages in the memory and to interrupt the CPU to process the transmission of such outbound messages.

* * * * *